O. J. BOOS.
INCLINATION INDICATOR.
APPLICATION FILED DEC. 11, 1917.
1,267,049.
Patented May 21, 1918.
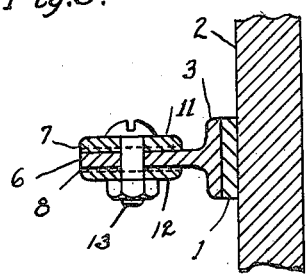
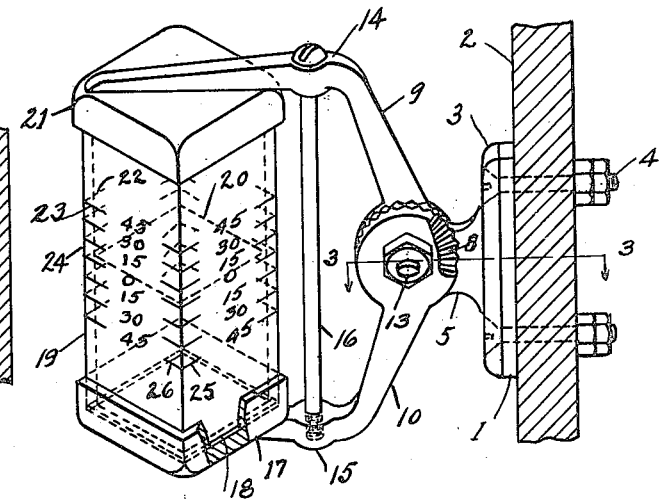
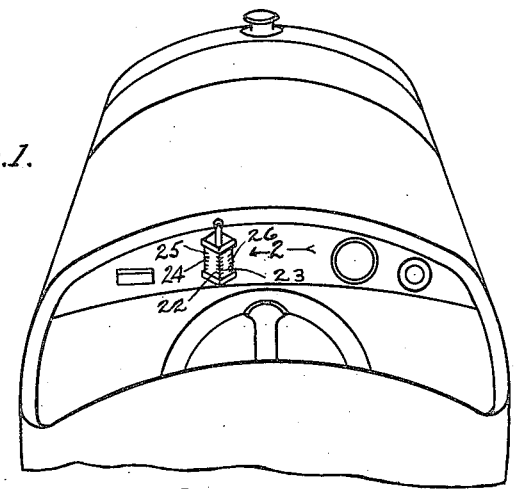
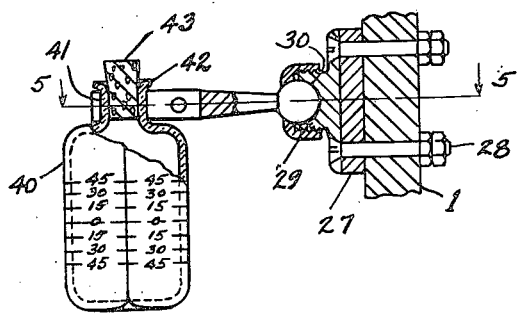
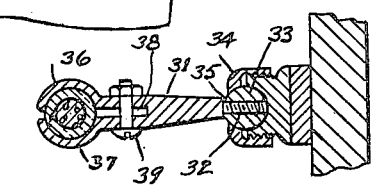
Inventor:
Orlando J. Boos,
by Hazard & Miller
Atty.

UNITED STATES PATENT OFFICE.

ORLANDO J. BOOS, OF LOS ANGELES, CALIFORNIA.

INCLINATION-INDICATOR.

1,267,049.

Specification of Letters Patent. Patented May 21, 1918.

Application filed December 11, 1917. Serial No. 206,685.

*To all whom it may concern:*

Be it known that I, ORLANDO J. BOOS, a citizen of the United States, residing at Los Angeles, in the county of Los Angeles and State of California, have invented new and useful Improvements in Inclination-Indicators, of which the following is a specification.

My object is to make a direction indicator for aeroplanes and the like which will show to the operator the angle at which he is traveling relative to the plane of the earth surface, and my invention consists in the novel features herein shown, described and claimed.

My direction indicator is especially important when flying through fog, clouds, or storms, as it enables the operator to determine whether the machine is going up or going down or turning over sidewise.

Figure 1 is a fragmentary perspective showing my direction indicator in position for use upon the instrument board of an aeroplane cab.

Fig. 2 is an enlarged side elevation as seen looking in the direction indicated by the arrow 2 in Fig. 1, the instrument board being broken away and shown in section to economize space.

Fig. 3 is a horizontal sectional detail on the line 3—3 of Fig. 2.

Fig. 4 is a view analogous to Fig. 2 and showing a modified construction.

Fig. 5 is a horizontal sectional detail on the line 5—5 of Fig. 4.

A rubber pad 1 is placed against the face of the instrument board 2, and an attaching plate 3 is placed against the pad and held in position by bolts 4 inserted through the plate, through the pad, and through the board. An arm 5 extends forwardly from the attaching plate 3 and a bearing plate 6 is formed integral with the arm 5, said bearing plate 6 being vertical and substantially circular in side elevation and its side faces 7 and 8 are serrated. The supporting arms 9 and 10 have bearing plates 11 and 12, the inner faces of which are serrated to fit the faces 7 and 8, and a clamping bolt 13 is inserted through the plates 6, 11 and 12, to hold the arms 9 and 10 rigidly in an adjusted position, the outer ends of said arms being inclined forwardly from a vertical line. Bolt seats 14 and 15 extend forwardly from the outer ends of the arms 9 and 10 and a clamping bolt 16 is inserted downwardly through the seat 14 and screw-seated in the seat 15 so as to draw the arms together to the desired extent.

A square cup 17 extends outwardly from the bolt seat 15 and a gasket 18 is placed in the bottom of the cup and a square gage glass 19 is inserted downwardly into the cup against the gasket. The glass is substantially half filled with mercury 20. The inverted cup 21 extends outwardly from the bolt seat 14 in alinement with the cup 17 and fits the upper end of the glass 19. The cups 17 and 21 are adjusted to and from each other by manipulating the bolt 16.

The device thus constructed preferably stands cornerwise to the operator so that the two sides of the glass 19 may be seen simultaneously. A series of graduations 22 and 23 is formed upon each side of the front corner 24 of the glass, and similar graduations 25 and 26 are formed upon the rear edges of the two front sides of the glass. The graduations are so located that the lines marked "0" are on a level with the surface of the mercury when the aeroplane is in a level position, the graduations reading up and down in degrees from zero marks so that if the machine is level crosswise and is going upwardly, the angle at which it is climbing will appear upon the graduations 22 and 23. If the mercury goes down to "15" that will indicate that the machine is going upwardly at an angle of fifteen degrees relative to a level, and if the machine tilts sidewise the angularity will appear upon the graduations 25 and 26, reading down on one side and up on the other side.

In place of positioning the device in front of the operator as shown, it may be placed to one side of the instrument board, and if desired, the glass 19 may be arranged squarely, so that the same will be at an angle of 45° to the arrangement shown. The aviator, because of the position of the device on one side of the instrument board, will be enabled to see two sides of the glass, the same as in the position shown in the drawings.

Referring to the modification shown in Figs. 4 and 5, the attaching plate 27 is secured to the instrument board 1 by bolts and lock-nuts 28. A screw-threaded nipple 29 extends forwardly from the center of the plate 27 and has a seat 30 in its front face for a ball bearing. The supporting arm 31 has a screw-threaded nipple 32 upon its rear end and the bearing ball 33 is screwed tight upon this nipple, the bearing cap 34 having been inserted before the ball is screwed into place. The bearing cap 34 has a central opening larger than the arm 31 and a bearing face 35 to fit against the ball 33, and the cap is screw-seated upon the nipple 29 so that by tightening the cap the ball may be tightened to make a stiff joint for supporting the arm 31 in an adjusted position. Clamping jaws 36 and 37 are formed upon the end of the arm 31 opposite from the ball, and the arm 31 has a longitudinal slot 38 extending from between the jaws 36 and 37 and a bolt and nut 39 is inserted through the arm 31 transversely of the slot to draw the jaws 36 and 37 together. The indicator bottle 40 is preferably square in plan and has a neck 41 to be encircled by the jaws 36 and 37 and a bead 42 above the jaws. The bottle is filled with mercury to the zero mark and a cork 43 applied. The graduations, location, and operation of the bottle are the same as already described in relation to the glass in Fig. 2.

In applying my direction indicator to a flying machine, the machine should be set level and the indicator glass adjusted so that the surface of the mercury in the glass will be level, that is, at the zero marks all the way around. In Fig. 1 the glass is leveled by manipulating the bolt 13, and in Fig. 4 the glass is leveled by manipulating the cap 34.

Various changes may be made in the details of construction without departing from the spirit of my invention as set up in the following claims.

I claim:

1. An inclination indicator for aeroplanes and the like, comprising a glass receptacle square in plan and having vertical flat sides and partly filled with mercury, and means for mounting the receptacle on a level in the aeroplane or the like with two diagonally opposite corners longitudinally of the machine and the other two transversely; said receptacle having graduations at the corners upon the front faces reading up and down from the normal level of the upper face of the mercury.

2. An inclination indicator for aeroplanes and the like, comprising a hollow glass square in cross section, a cup fitting the lower end of the glass, a gasket in the cup between the edge of the glass and the bottom, an inverted cup fitting the upper end of the glass, and mercury partly filling the glass; said glass having graduations upon its face reading up and down from the normal level of the mercury.

3. An inclination indicator for aeroplanes and the like, comprising a hollow glass square in cross section, a cup fitting the lower end of the glass, a gasket in the cup between the edge of the glass and the bottom, an inverted cup fitting the upper end of the glass, mercury partly filling the glass; said glass having graduations upon its face reading up and down from the normal level of the mercury; and means for mounting the glass in a normally level position upon an aeroplane or the like.

4. An inclination indicator for aeroplanes and the like, comprising a hollow glass square in cross section, a cup fitting the lower end of the glass, a gasket in the cup between the edge of the glass and the bottom, an inverted cup fitting the upper end of the glass, mercury partly filling the glass; said glass having graduations upon its face reading up and down from the normal level of the mercury; and means for mounting the glass upon an aeroplane or the like so as to be adjusted to the normal level of the machine.

In testimony whereof I have signed my name to this specification.

ORLANDO J. BOOS.